(12) United States Patent
Ishimoto et al.

(10) Patent No.: US 11,287,287 B2
(45) Date of Patent: Mar. 29, 2022

(54) ABNORMAL STATE DETERMINATION SYSTEM

(71) Applicant: DMG MORI Co., Ltd., Yamatokoriyama (JP)

(72) Inventors: Shigeru Ishimoto, Isehara (JP); Koichi Hihara, Isehara (JP)

(73) Assignee: DMG MORI Co., Ltd., Yamatokoriyama (JP)

( * ) Notice: Subject to any disclaimer, the term of this patent is extended or adjusted under 35 U.S.C. 154(b) by 285 days.

(21) Appl. No.: 16/519,052

(22) Filed: Jul. 23, 2019

(65) Prior Publication Data

US 2020/0049531 A1 Feb. 13, 2020

(30) Foreign Application Priority Data

Aug. 8, 2018 (JP) .............................. JP2018-149507

(51) Int. Cl.
  *G01D 5/244* (2006.01)
(52) U.S. Cl.
  CPC .............................. *G01D 5/24466* (2013.01)
(58) Field of Classification Search
  CPC .............................. G01D 5/24466; G01D 3/08
  See application file for complete search history.

(56) References Cited

U.S. PATENT DOCUMENTS

| | | | |
|---|---|---|---|
| 6,871,633 B1* | 3/2005 | Date ..................... | F02D 33/006 123/445 |
| 7,603,250 B2 | 10/2009 | Nishimoto et al. | |
| 2001/0013771 A1* | 8/2001 | Wasmer ............... | G01R 19/155 324/86 |
| 2015/0352679 A1* | 12/2015 | Yamamoto ........... | B23Q 17/007 73/865.8 |
| 2017/0307645 A1 | 10/2017 | Hess et al. | |
| 2019/0107068 A1* | 4/2019 | Nose ....................... | F01N 9/005 |

FOREIGN PATENT DOCUMENTS

| | | |
|---|---|---|
| JP | 2007322197 A | 12/2007 |
| JP | 2014215114 A | 11/2014 |
| JP | 201689797 A | 5/2016 |
| JP | 2017133989 A | 8/2017 |

* cited by examiner

*Primary Examiner* — Bryan Bui
(74) *Attorney, Agent, or Firm* — The Webb Law Firm

(57) ABSTRACT

Provided is a highly reliable abnormal state determination system that can prevent erroneous determination even in a case where a determination condition for determining an abnormal state in measurement using a sensor cannot be changed. Provided is an abnormal state determination system 100 including: an abnormal state determination unit 40 configured to determine an abnormal state by using a detection signal based on a signal output from a sensor 10; and a specific processing unit 50 configured to, when a predetermined condition is satisfied, perform control processing for adjusting strength of the detection signal before the detection signal is input to the abnormal state determination unit 40.

13 Claims, 5 Drawing Sheets

ABNORMAL STATE DETERMINATION SYSTEM

CROSS-REFERENCE TO RELATED APPLICATION

This application claims priority to Japanese Patent Application No. 2018-149507 filed Aug. 8, 2018, the disclosure of which is hereby incorporated in its entirety by reference.

BACKGROUND

Technical Field

The present invention relates to an abnormal state determination system that determines an abnormal state in measurement using a sensor.

Related Art

It is important for a measurement apparatus to accurately detect abnormality of a sensor and give an alarm. However, in determination on whether abnormality has occurred, erroneous determination may occur depending on an environment in which the sensor is placed. In order to solve this problem, for example, as to a temperature sensor attached to an automobile, there is proposed a temperature sensor abnormality diagnosis apparatus that prevents erroneous determination caused by an environmental change (for example, see JP 2016-89797 A).

SUMMARY

The temperature sensor abnormality diagnosis apparatus disclosed in JP 2016-89797 A is configured so that abnormality diagnosis is cancelled or a threshold for abnormality diagnosis is corrected on the basis of a differential value between a value of an outside air temperature sensor or intake air temperature sensor detected when the automobile starts to run and a value thereof detected when a predetermined time elapses after the automobile starts to run. This prevents erroneous determination from occurring when the automobile starts to run.

However, in a case where abnormality diagnosis is cancelled to prevent erroneous determination, it is completely impossible to perform abnormality diagnosis of the temperature sensor. This deteriorates reliability as a diagnosis apparatus. Meanwhile, in a case where a threshold serving as a condition for determining an abnormal state is corrected to prevent erroneous determination, for example, the condition for determining an abnormal state cannot be changed when the threshold is defined by standards or the like of constituent members of the apparatus. Therefore, this temperature sensor abnormality diagnosis apparatus cannot be applied.

The present invention has been made in view of the above problems, and an object thereof is to provide a highly reliable abnormal state determination system that can prevent erroneous determination even in a case where a determination condition for determining an abnormal state in measurement using a sensor cannot be changed.

In order to solve the above problems, an abnormal state determination system according to an aspect of the present invention includes:

an abnormal state determination unit configured to determine an abnormal state by using a detection signal based on a signal output from a sensor; and a specific processing unit configured to, when a predetermined condition is satisfied, perform control processing for adjusting strength of the detection signal before the detection signal is input to the abnormal state determination unit.

According to the above aspect, it is possible to provide a highly reliable abnormal state determination system that can prevent erroneous determination even in a case where a determination condition for determining an abnormal state in measurement using a sensor cannot be changed.

DETAILED DESCRIPTION

Hereinafter, embodiments and examples for implementing the present invention will be described with reference to the drawings. It is noted that the following description shows examples for embodying a technical idea of the present invention, and the present invention is not limited to the following examples, unless otherwise stated.

In each drawing, members having the same functions may be denoted by the same reference signs. In order to easily describe or understand main points, the present invention will be separately described by using embodiments and examples for convenience sake in some cases. However, it is possible to partially replace or combine configurations described in different embodiments or examples. In the embodiments and examples described below, description regarding the same items as items that have already been described will be omitted, and only differences will be described. In particular, similar effects caused by similar configurations will not be repeatedly described in the embodiments and examples. Size, positional relationships, and the like of members shown in each drawing may be exaggeratedly shown in order to clearly describe the present invention.

(Abnormal State Determination System According to an Embodiment of Present Invention)

Figure 1A:
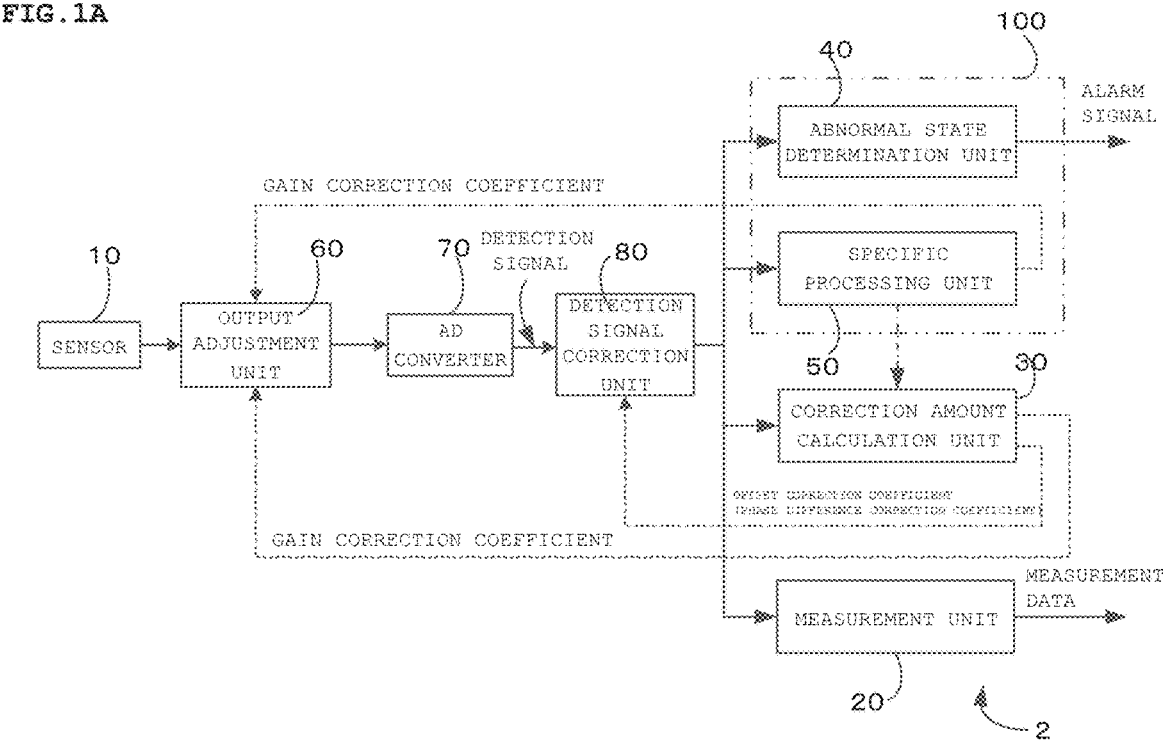
FIG. 1A is a block diagram showing an overview of a measurement apparatus including an abnormal state determination system according to an embodiment of the present invention.

First, a measurement apparatus including an abnormal state determination system according to an embodiment of the present invention will be described with reference to FIG. 1A. FIG. 1A is a block diagram showing an overview of a measurement apparatus including an abnormal state determination system according to an embodiment of the present invention.

A measurement apparatus 2 according to this embodiment includes a sensor 10, an output adjustment unit 60, an AD converter 70, a detection signal correction unit 80, a measurement unit 20, a correction amount calculation unit 30, an abnormal state determination unit 40, and a specific processing unit 50. The abnormal state determination unit 40 and the specific processing unit 50 form an abnormal state determination system 100 according to this embodiment (see a two-dot chain line in FIG. 1A).

It is possible to employ an arbitrary sensor as the sensor 10, such as a position sensor, an acceleration sensor, a vibration sensor, a load sensor, and a temperature sensor.

An analog signal output from the sensor 10 is amplified in the output adjustment unit 60 and is converted into a direct current signal in the AD converter 70, thereby serving as a detection signal. Then, the detection signal is corrected by the detection signal correction unit 80 in terms of an offset amount and the like and is then input to the measurement unit 20, the correction amount calculation unit 30, the abnormal state determination unit 40, and the specific processing unit 50.

The measurement unit 20 defines a measurement value according to a type of the sensor on the basis of the signal output from the sensor 10, specifically, by using the detection signal, and outputs measurement data.

The correction amount calculation unit 30 calculates a gain correction coefficient for correcting a gain in the output adjustment unit 60 on the basis of the detection signal so that strength of the detection signal amplified in the output adjustment unit 60 falls within a proper range and transmits the gain correction coefficient to the output adjustment unit 60. Further, the correction amount calculation unit 30 calculates an offset correction coefficient for correcting an offset amount from an initial position in the detection signal and transmits the offset correction coefficient to the detection signal correction unit 80. It is noted that, in a case where signals having a phase difference are output from the sensor 10, the correction amount calculation unit 30 calculates a phase difference correction coefficient for correcting the phase difference between detection signals and transmits the phase difference correction coefficient to the detection signal correction unit 80.

As described above, in this embodiment, the gain for correcting the strength of the detection signal is corrected when the detection signal is still an analog signal, and the offset and the phase difference are corrected after the detection signal is converted into a digital signal. A feedback signal transmitted from the correction amount calculation unit 30 to the output adjustment unit 60 or the detection signal correction unit 80 in order to correct the gain, the offset, and the like is shown by a dotted line arrow.

The abnormal state determination unit 40 forming the abnormal state determination system 100 determines an abnormal state by using the detection signal based on the signal output from the sensor 10 and performs control processing for outputting an alarm signal when the abnormal state determination unit 40 determines that an abnormal state has occurred.

When a predetermined condition is satisfied, the specific processing unit 50 forming the abnormal state determination system 100 performs control processing for adjusting the strength of the detection signal before the detection signal is input to the abnormal state determination unit 40. The wording "adjust" herein means that the strength is increased or decreased so that the strength of the detection signal falls within a predetermined range. The control processing for adjusting the strength of the detection signal can be achieved by filtering or masking the detection signal or can also be achieved by adjusting the gain in the output adjustment unit 60 as described below.

The wording "abnormal state" means a state in which, in the measurement apparatus 2 including the sensor 10, measurement should be stopped due to short circuit, disconnection, damage to the constituent members, or the like. Further, the wording "a predetermined condition is satisfied" means a situation in which, although the "abnormal state" does not actually occur, the detection signal indicates an extremely large (or small) value due to disturbance, an environmental factor, or the like and the abnormal state determination unit 40 determines an abnormal state. A case where "a predetermined condition is satisfied" also encompasses a case where, as described below, the detection signal is largely changed at an interval shorter than an interval at which the gain is corrected in the output adjustment unit 60 on the basis of a feedback signal output from the correction amount calculation unit 30 and the abnormal state determination unit 40 determines an abnormal state.

In a case where erroneous determination may occur in determination on an abnormal state, the condition for determining an abnormal state is generally changed. However, in a case where a determination value of the abnormal state is defined on the basis of, for example, an input tolerance value of a constituent member of the apparatus or the like, the condition for determining an abnormal state cannot be changed. By referring to the case shown in FIG. 1A, it is possible to exemplify a case where the determination value of the abnormal state is defined by an input tolerance value of the AD converter 70.

In this embodiment, in a case where erroneous determination may occur, the specific processing unit 50 performs the control processing for adjusting the strength of the detection signal before the detection signal is input to the abnormal state determination unit 40. With this, even in case where the condition for determination cannot be changed, it is possible to securely prevent erroneous determination.

As a specific example, there is a control processing in which the abnormal state determination unit 40 compares the detection signal with a predetermined threshold and determines that an abnormal situation has occurred in a case where a value of the detection signal is larger (or smaller) than the threshold.

At this time, when the predetermined condition is satisfied, the specific processing unit 50 transmits a feedback signal for decreasing or increasing the gain amplified in the output adjustment unit 60 to the output adjustment unit 60 so that the strength of the detection signal falls within the predetermined range (see a dotted line arrow in FIG. 1A). It is noted that there is not only the case where the feedback signal is transmitted from the specific processing unit 50 to the output adjustment unit 60 but also a case where the correction amount calculation unit 30 is controlled by the specific processing unit 50 (see an alternate long and short dash line arrow in FIG. 1A) so that a feedback signal is transmitted from the correction amount calculation unit 30 to the output adjustment unit 60 in order to decrease the gain amplified in the output adjustment unit 60.

The feedback signal output from the correction amount calculation unit 30 or the specific processing unit 50 can be generated by an electrical circuit or can also be generated by software based on a predetermined algorithm. It is noted that, in a case where an abnormal state occurs due to short circuit, disconnection, damage to the constituent members, or the like, although the strength of the detection signal is adjusted by the specific processing unit 50, the detection signal still has sufficient strength to cause the abnormal state determination unit 40 to determine abnormality. This makes it possible to securely detect an abnormal state.

As described above, in this embodiment, even in a case where the determination condition for determining an abnormal state in measurement using the sensor 10 cannot be changed, it is possible to provide the highly reliable abnormal state determination system 100 that can prevent erroneous determination.

The measurement apparatus 2 including the above abnormal state determination system 100, the sensor 10, the measurement unit 20 that defines the measurement value by using the detection signal, and the correction amount calculation unit 30 for correcting the strength of the detection signal can also have a similar effect.

(Abnormal State Determination System According to Another Embodiment of Present Invention)

Figure 1B:
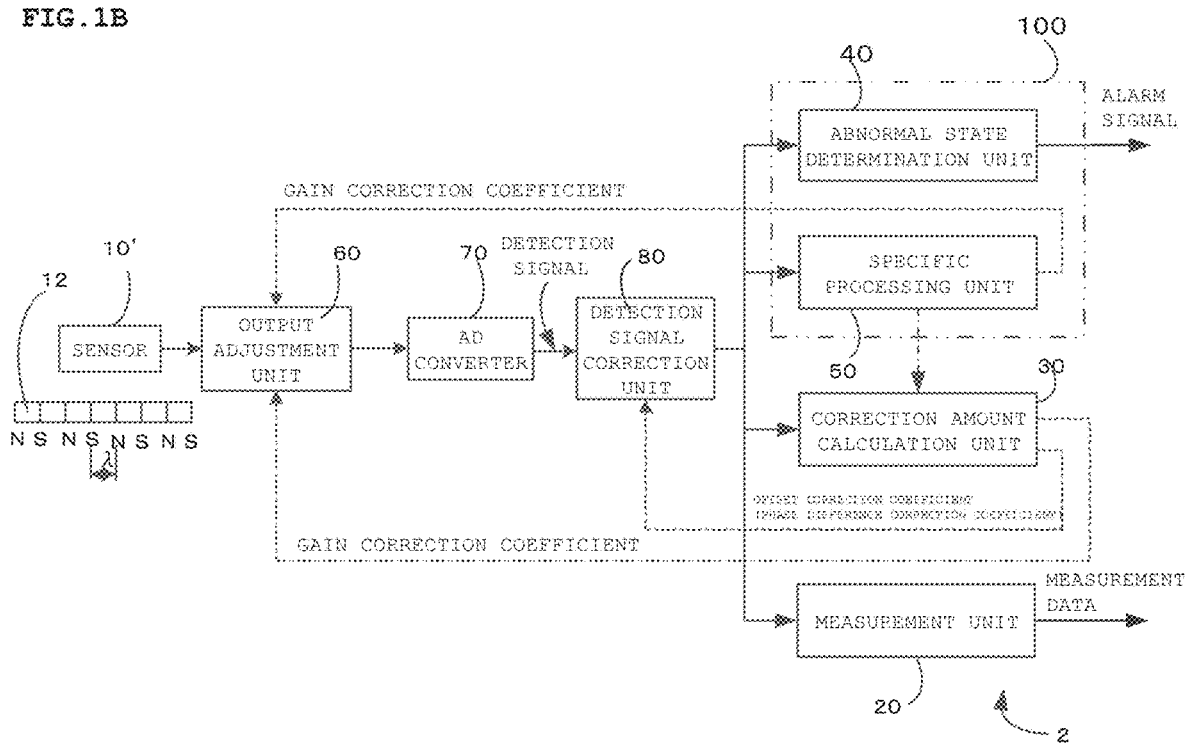
FIG. 1B is a block diagram showing an overview of a measurement apparatus including an abnormal state determination system according to another embodiment of the present invention.

Next, an abnormal state determination system according to another embodiment of the present invention will be described with reference to FIG. 1B. FIG. 1B is a block diagram showing an overview of a measurement apparatus including an abnormal state determination system according to another embodiment of the present invention.

In this embodiment, a sensor 10' is different from the sensor in the above embodiment shown in FIG. 1A. The sensor 10' shown in FIG. 1B is a magnetic sensor placed to have a predetermined space from a scale 12 having a magnetic pattern. The sensor 10' includes two MR sensors, and the scale 12 has a magnetic pattern in which North and South poles are alternately placed at a pitch λ.

The MR sensors are thin film sensors patterned on a substrate, and, when the MR sensors relatively move while maintaining a certain space from the scale 12, resistance values are changed in accordance with a magnitude of a leakage magnetic field from the scale 12, and the MR sensors output signals. In order to cancel a distortion component of a higher harmonic component or the like, the two MR sensors are placed at a distance of λ/6 from each other, and the sensor 10 outputs a sine wave and a cosine wave whose phases are shifted at 90°.

The measurement unit 20 can grasp that, when detection signals based on the sine wave and the cosine wave have reached peak values, the detection signals have reached a position of the North Pole or the South Pole of the magnetic pattern. Therefore, the measurement unit 20 can accurately define distances from a reference position of the scale 12 on the basis of the number of times of reaching the peak values.

Further, in the sine wave and the cosine wave that periodically change, amplitudes thereof can be firstly grasped when the detection signals reach the peak values. Therefore, when the detection signals reach the peak values of the sine wave and the cosine wave, the correction amount calculation unit 30 transmits gain correction coefficients to the output adjustment unit 60, and thus gains can be corrected in the output adjustment unit 60. Similarly, offset amounts from an origin can be firstly grasped when the detection signals reach the peak values. Therefore, when the detection signals reach the peak values of the sine wave and the cosine wave, the correction amount calculation unit 30 transmits offset correction coefficients to the detection signal correction unit 80 and can therefore correct offsets in the detection signals. Further, a phase difference between the sine wave and the cosine wave can be firstly and accurately grasped when the detection signals reach the peak values.

Therefore, when the detection signals reach the peak values of the sine wave and the cosine wave, the correction amount calculation unit 30 transmits the phase difference correction coefficient to the detection signal correction unit 80 and can therefore correct the phase difference between the detection signals.

The embodiment shown in FIG. 1B is similar to the embodiment shown in FIG. 1A other than the sensor 10', and therefore detailed description of other components will be omitted.

<Lissajous Figure>

Figure 2A:
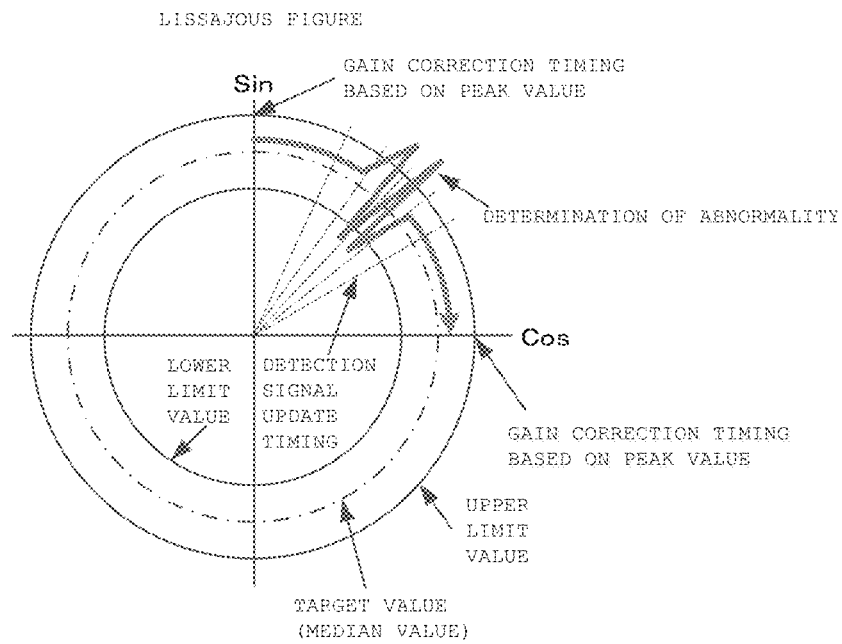
FIG. 2A is a Lissajous figure showing a state before control processing for adjusting strength of detection signals is performed by a specific processing unit.
Figure 2B:
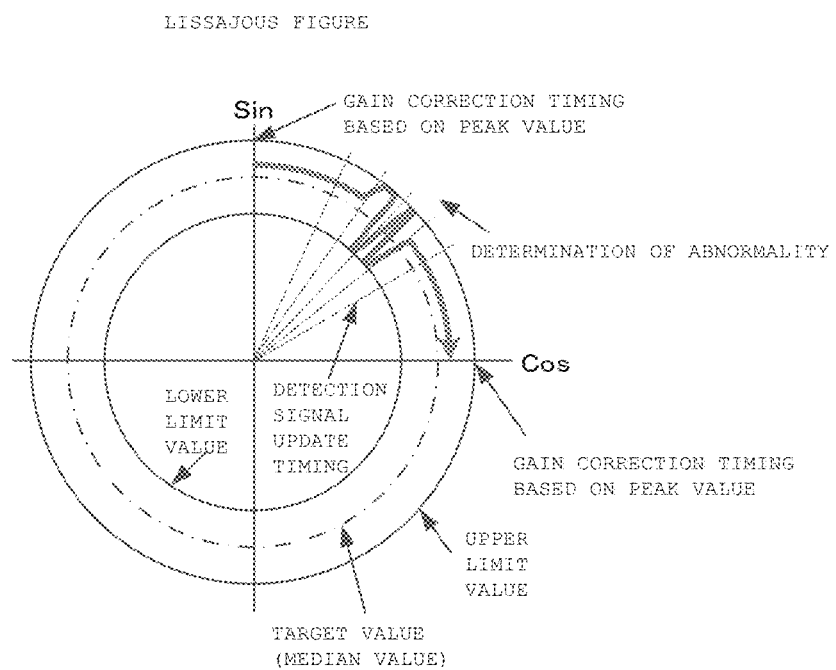
FIG. 2B is a Lissajous figure showing a state after control processing for adjusting strength of detection signals is performed by a specific processing unit.

Next, a case where, when the sensor 10 outputs signals of a sine wave and a cosine wave due to relative movement between the sensor 10 and the scale 12, the specific processing unit 50 performs control processing for adjusting strength of detection signals will be described with reference to FIGS. 2A and 2B. FIG. 2A is a Lissajous figure showing a state before the control processing for adjusting the strength of the detection signals is performed by the specific processing unit. FIG. 2B is a Lissajous figure showing a state after the control processing for adjusting the strength of the detection signals is performed by the specific processing unit.

Herein, the Lissajous figure is a plan view drawn by tracks of points obtained by using two simple harmonic motions orthogonal to each other as an ordered pair. In FIGS. 2A and 2B, a vertical axis represents a sine (Sin), and a horizontal axis represents a cosine (Cos). In the sine and the cosine whose phases are shifted at 90°, a Lissajous figure has a circular shape.

As described above, amplitudes of the sine wave and the cosine wave can be firstly calculated when the detection signals reach the peak values. Therefore, the correction amount calculation unit 30 corrects the strength of the detection signals on the basis of the peak values of the signals that periodically change. In FIGS. 2A and 2B, the correction amount calculation unit 30 can correct the strength of the detection signals when the sine wave and the cosine wave that move clockwise reach the vertical axis and the horizontal axis, but cannot correct the strength of the detection signals therebefore. Although radial straight dotted lines indicate update timings of the detection signals in FIGS. 2A and 2B, the correction amount calculation unit 30 cannot correct the strength of the detection signals at an update timing before the detection signals reach the peak values.

For example, in a case where a member in which the sensor 10 and the scale 12 are placed vibrates, the space between the sensor 10 and the scale 12 is changed. Therefore, even in a state in which the sensor 10 and the scale 12 do not actually relatively move, a large signal (or a small signal whose strength is cancelled depending on a direction of the vibration) may be output from the sensor. In particular, a large (or small) signal may be output from the sensor 10 at an extremely short timing after signals of the sine wave and the cosine wave move from the peak values but before the signals reach the next peak values.

In that case, the correction amount calculation unit 30 cannot correct the strength of the detection signals, and therefore the abnormal state determination unit 40 may determine that an abnormal state has occurred. In other words, this is the case where "a predetermined condition is satisfied" described above, and erroneous determination may occur in determination on an abnormal state.

Meanwhile, since a Lissajous figure is used in the specific processing unit 50 according to this embodiment, it is possible to calculate a radius of a Lissajous circle (circular Lissajous figure) at arbitrary update timings of the detection signals. When a value of the sine wave at the arbitrary update timing of the detection signal is denoted by A, a value of the cosine wave at the arbitrary update timing thereof is denoted by B, and the radius of the Lissajous circle is denoted by R, the radius can be calculated by $R=SQR(A^2+B^2)$.

With this, it is possible to calculate values corresponding to the amplitudes at the arbitrary update timings of the detection signals.

FIGS. 2A and 2B show that the Lissajous circle of the sine wave and the cosine wave moves clockwise in an upper right area among areas divided by the vertical axis and the horizontal axis. As shown in FIG. 2A, the strength of the detection signals is increased due to vibration or the like, and the abnormal state determination unit 40 may determine that values of the input detection signals are larger (or smaller) than a predetermined threshold and then determine an abnormal state.

Herein, as an aspect in which the abnormal state determination unit 40 determines an abnormal state, the following case can be exemplified: in a case where the abnormal state determination unit 40 determines that the values of the detection signals are larger (or smaller) than the threshold at N (N: integer of two or more) update timings of the detection signals in consideration of electronic noise and the like, the abnormal state determination unit 40 determines an abnormal state.

In this embodiment, when the radius of the Lissajous circle formed by the sine wave and the cosine wave is larger than a predetermined upper limit value or is smaller than a predetermined lower limit value, a differential value from a target value (herein, median value) is calculated, and a gain is corrected in the output adjustment unit 60 in accordance with the differential value (for example, in proportion to the differential value). For example, in a case where the differential value between the radius and the upper limit value is large, the gain is corrected to be decreased accordingly. It is noted that, for feedback control used herein, it is possible to employ an already-known arbitrary method such as proportional control, integral control, differential control, and arbitrary combinations thereof.

By such control processing, as shown in FIG. 2B, the radius of the Lissajous circle formed by the sine wave and the cosine wave can be included in a range between the upper limit value and the lower limit value.

As described above, in a case where the values of the detection signals are larger (or smaller) than the threshold at a plurality of update timings of the detection signals, the abnormal state determination unit 40 determines an abnormal state. Therefore, even if a value of a large detection signal is input to the abnormal state determination unit 40 once, the value of the detection signal fall within a range defined by the thresholds at the next update timing because of the above control processing. Therefore, it is possible to prevent the abnormal state determination unit 40 from determining an abnormal state.

It is noted that, in a case where the radius of the Lissajous circle is used, the amplitudes can be calculated, but the offset amounts from initial positions in the output adjustment unit 60 cannot be calculated. However, the offset amounts are values smaller than the threshold for determining whether an abnormal state has occurred and therefore do not influence determination in the abnormal state determination unit 40.

As described above, in this embodiment, the sensor 10 is a magnetic sensor placed to have the predetermined space from the scale 12 having the magnetic pattern, and the sensor 10 outputs signals of the sine wave and the cosine wave due to relative movement between the sensor 10 and the scale 12. At this time, the specific processing unit 50 calculates the radius of the Lissajous circle formed by the sine wave and the cosine wave in the detection signals and, when the radius exceeds a predetermined range, performs the control processing for adjusting the strength of the detection signals.

There is a case where, even if the sensor 10 and the scale 12 do not relatively move, the space between the sensor 10 and the scale 12 is changed due to vibration or the like, and a strong (or weak) detection signal is input to the abnormal state determination unit 40. There is also a case where a strong (or weak) detection signal is input to the abnormal state determination unit 40 at an extremely short timing before the detection signals reach the peak values of the sine wave and the cosine wave. Even in such cases, in this embodiment, it is possible to quickly decrease (or increase) the strength of the detection signals and accurately perform erroneous determination preventing control.

In particular, in this embodiment, the specific processing unit 50 compares a value of the radius of the Lissajous circle with a predetermined value at each update timing of the detection signals. With this, when the radius of the Lissajous circle exceeds the predetermined range, it is possible to quickly adjust the strength of the detection signals.

At this time, in a case where the abnormal state determination unit 40 is configured to determine that an abnormal state has occurred when the values of the detection signals exceed the threshold at a plurality of update timings, the control for adjusting the strength of the detection signals performed by the specific processing unit 50 can securely prevent the abnormal state determination unit 40 from performing erroneous determination.

In particular, in a case where the threshold for use in determination on an abnormal state is defined on the basis of the input tolerance value of the AD converter 70 placed on an upstream side of the abnormal state determination unit 40 and the specific processing unit 50 in a flow of the signals, it is possible to effectively prevent erroneous determination.

It is noted that the present invention is not limited to a case where the sine wave and the cosine wave are output from the sensor 10, and the same applies to a case where another arbitrary signal that periodically changes is output from the sensor 10.

Strength of a detection signal is corrected by the correction amount calculation unit 30 on the basis of a value at an inflection point of a signal that periodically changes. In this case, in a case where a detection signal having high strength is input at a short interval between an inflection point of the signal that periodically changes and the next inflection point thereof, the correction amount calculation unit 30 cannot correct the strength of the detection signal. Therefore, the abnormal state determination unit 40 may determine that an abnormal state has occurred.

Even in such a case, when a value of the detection signal based on the signal that periodically changes exceeds the predetermined range, the specific processing unit 50 can perform, for example, control processing for adjusting the strength of the detection signal by using the Lissajous figure. With this, it is possible to accurately prevent erroneous determination.

In other words, when the signal that periodically changes is output from the sensor 10 and the value of the detection signal based on the signal that periodically changes exceeds the predetermined range, the specific processing unit 50 performs control processing for adjusting the strength of the detection signal.

With this, also in a case where the signal that periodically changes is output from the sensor 10, erroneous determination can be securely prevented.

It is noted that, as described in the embodiment with reference to FIG. 1A, the present invention is not limited to a case where a signal that periodically changes is output from the sensor 10 but encompasses a case where another arbitrary signal is output from the sensor 10. In a case where the abnormal state determination system 100 according to this embodiment includes at least the abnormal state determination unit 40 that determines an abnormal state by using a detection signal based on a signal output from the sensor 10 and the specific processing unit 50 that, when a predetermined condition is satisfied, performs the control processing for adjusting the strength of the detection signal before the detection signal is input to the abnormal state determination unit 40, it is possible to provide a highly reliable abnormal state determination system that can prevent erroneous determination even in a case where a determination condition for determining an abnormal state in measurement using a sensor cannot be changed.

(Example of Circuits of Correction Amount Calculation Unit and Specific Processing Unit)

Figure 3:
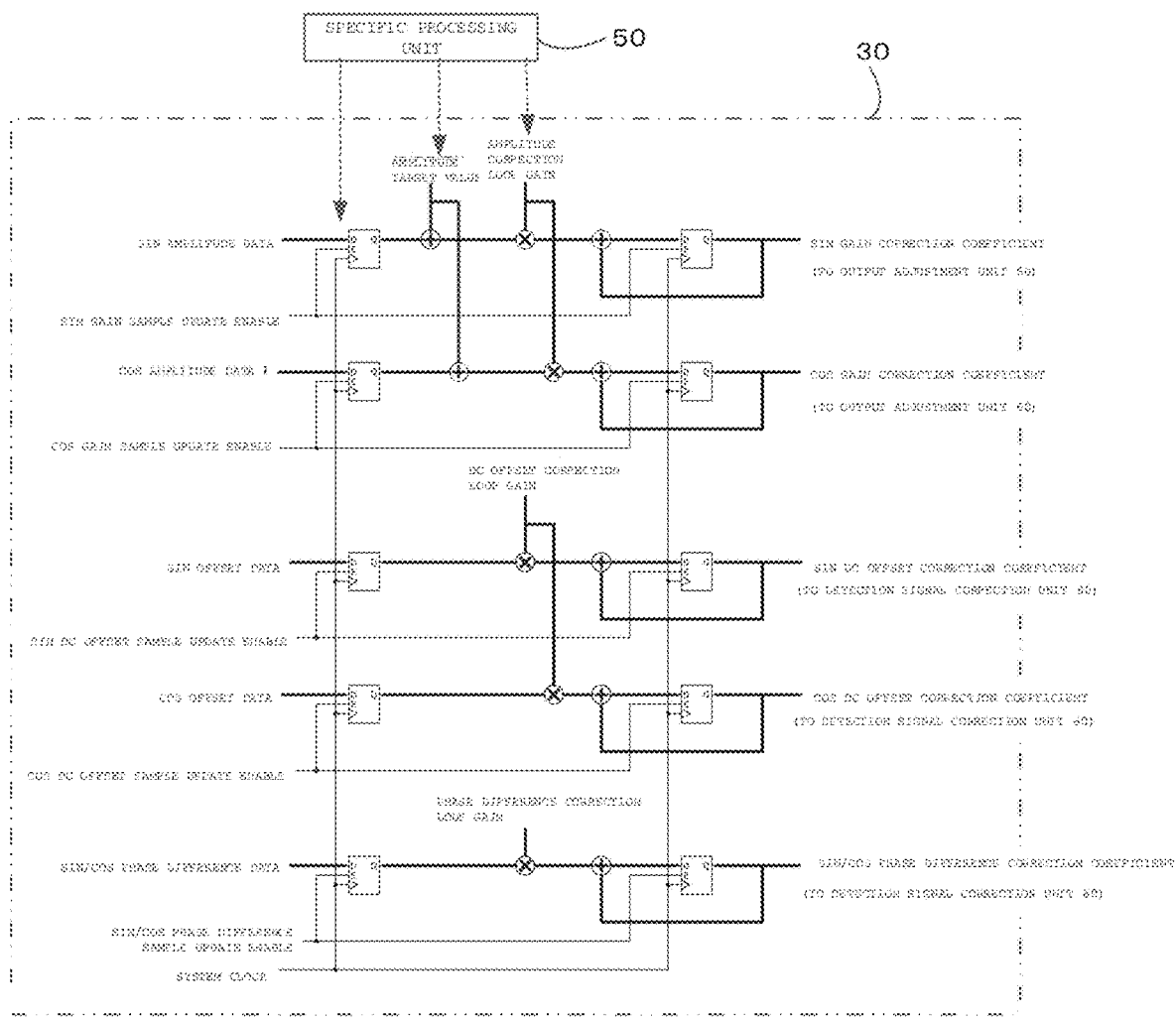
FIG. 3 is a circuit diagram showing an example of a circuit of a correction amount calculation unit controlled by a specific processing unit.

Next, an example of specific circuits of the correction amount calculation unit 30 and the specific processing unit 50 that achieve the above embodiments will be described with reference to FIG. 3. FIG. 3 is a circuit diagram showing an example of a circuit of the correction amount calculation unit controlled by the specific processing unit. The correction amount calculation unit 30 shown in FIG. 3 includes, for each of sine and cosine waves, a circuit for defining a gain correction coefficient to correct a gain and a circuit for defining an offset correction coefficient to correct an offset. The correction amount calculation unit 30 further includes a circuit for defining a phase difference correction coefficient to correct a phase difference between the sine wave and the cosine wave.

First, the circuit for defining a gain correction coefficient in a sine wave will be described. When amplitude data based on a peak value of the sine wave is updated, a differential value from a target value of the amplitude is obtained, the differential value is multiplied by an amplitude correction loop gain, and thus a gain correction coefficient in the sine wave is generated. This gain correction coefficient is transmitted to the output adjustment unit 60. Timings at which the amplitude data is updated are timings at which the sine wave reaches the peak value, and therefore an interval therebetween is considerably larger than an interval between update timings of the detection signal.

In this circuit, in a case where a predetermined condition is satisfied (in a case where the abnormal state determination unit 40 may perform erroneous determination), even at a timing before the amplitude data based on the peak value of the sine wave is updated, the specific processing unit 50 controls the correction amount calculation unit 30 so as to generate a gain correction coefficient that adjusts output of the detection signal to a predetermined value, and the gain correction coefficient is transmitted to the output adjustment unit 60.

The circuit for correcting a gain of the cosine wave is similar to the above circuit for correcting the gain of the sine wave, and therefore detailed description thereof will be omitted.

Next, the circuit for defining an offset correction coefficient in the sine wave will be described. When offset data based on the peak value of the sine wave is updated, an offset amount is multiplied by an offset correction loop gain, and thus an offset correction coefficient in the sine wave is generated. This offset correction coefficient is transmitted to the detection signal correction unit 80. It is noted that, since a target value is a zero position in correction of the offset, a differential value is not obtained, and correction is performed so that the offset amount becomes zero. Similarly, as described above, timings at which the amplitude data is updated are timings at which the sine wave reaches the peak value, and therefore the interval therebetween is considerably larger than the interval between the update timings of the detection signal.

The circuit for correcting an offset in the cosine wave is similar to the above circuit for correcting the offset in the sine wave, and therefore detailed description thereof will be omitted.

Next, the circuit for defining a phase difference correction coefficient to correct a phase difference between the sine wave and the cosine wave will be described. When data of a phase difference based on the peak values of the sine wave and the cosine wave is updated, the phase difference is multiplied by a phase difference correction loop gain, and thus a phase difference correction coefficient between the sine wave and the cosine wave is generated. This phase difference correction coefficient is transmitted to the detection signal correction unit 80. Similarly, as described above, timings at which the data of the phase difference is updated are timings at which the sine wave and the cosine wave reach the peak values, and therefore an interval therebetween is considerably larger than the interval between the update timings of the detection signal.

(Another Example of Circuits of Correction Amount Calculation Unit and Specific Processing Unit)

Figure 4:
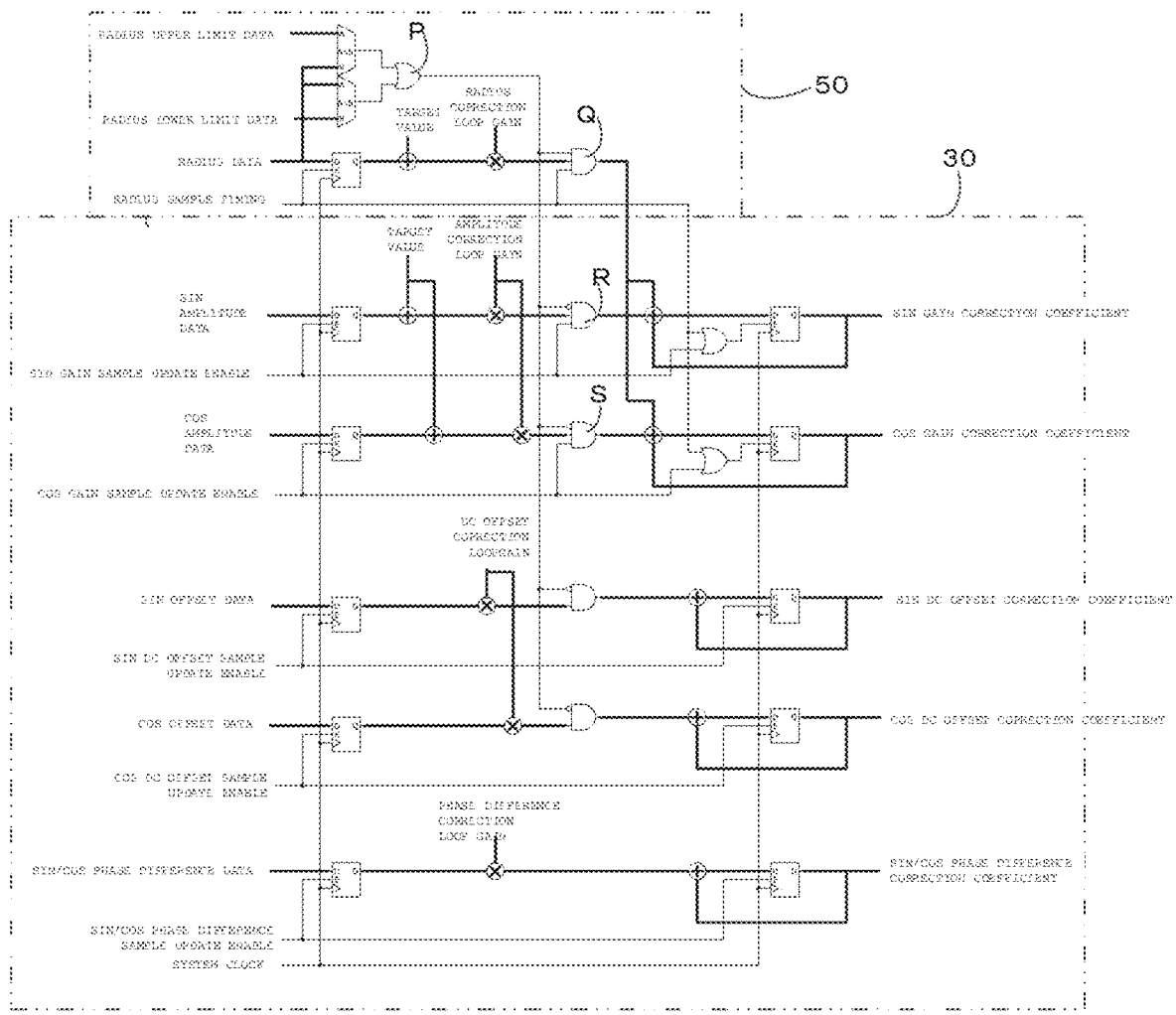
FIG. 4 is a circuit diagram showing another example of circuits of a specific processing unit and a correction amount calculation unit.

Next, another example of circuits of the correction amount calculation unit 30 and the specific processing unit 50 that achieve the above embodiments will be described with reference to FIG. 4. FIG. 4 is a circuit diagram showing another example of the circuits of the specific processing unit and the correction amount calculation unit.

The correction amount calculation unit 30 shown in FIG. 4 is substantially similar to the correction amount calculation unit shown in FIG. 3 and includes, for each of sine and cosine waves, a circuit for correcting a gain and a circuit for correcting an offset. The correction amount calculation unit 30 further includes a circuit for defining a phase difference correction coefficient to correct a phase difference between the sine wave and the cosine wave. More detailed description of the correction amount calculation unit 30 will be omitted.

In the example shown in FIG. 4, the circuit forming the specific processing unit 50 is connected to the circuits for correcting gains of the sine wave and the cosine wave in the correction amount calculation unit 30.

In the specific processing unit 50, when the radius of the Lissajous circle is updated corresponding to the update timing of the detection signal, a differential value between this radius and the target value is calculated, and the differential value is multiplied by a radius correction loop gain. Thus, a radius correction coefficient is generated. Simultaneously, the updated radius of the Lissajous circle is compared with a radius upper limit data and a radius lower limit data.

In a case where the updated radius of the Lissajous circle is larger than the radius upper limit data or in a case where the radius of the Lissajous circle is smaller than the lower limit data, a close OR gate P is opened. With this, a close AND gate Q is opened, and the correction coefficient of the gain for adjusting the strength of the detection signal is transmitted to both the circuit of the sine wave and the circuit of the cosine wave and is then transmitted to the output adjustment unit 60 from those circuits. That is, a generated radius correction coefficient is fed back as gain correction data for decreasing the amplitudes of the respective sine and cosine waves.

At this time, an open NAND gate R and an open NAND gate S on the correction amount calculation unit 30 side are closed, and therefore the correction coefficient of the gain cannot be transmitted from the correction amount calculation unit 30 to the output adjustment unit 60.

As described above, in this circuit, normally, a part between the correction amount calculation unit 30 and the output adjustment unit 60 is open, whereas a part between the specific processing unit 50 and the output adjustment unit 60 is close, and the gain correction coefficient is transmitted from the correction amount calculation unit 30 to the output adjustment unit 60. However, in a case where the radius of the Lissajous circle based on the detection signal exceeds a range between the upper limit value and the lower limit value, the part between the correction amount calculation unit 30 and the output adjustment unit 60 is changed from open to close, and the part between the specific processing unit 50 and the output adjustment unit 60 is changed from close to open. Then, the gain correction coefficient for adjusting the strength of the detection signal is transmitted from the specific processing unit 50 to the output adjustment unit 60.

The above circuit can securely prevent erroneous determination in determination on an abnormal state.

(Machine Tool in which Measurement Apparatus Including Abnormal State Determination System is Mounted)

Figure 5:
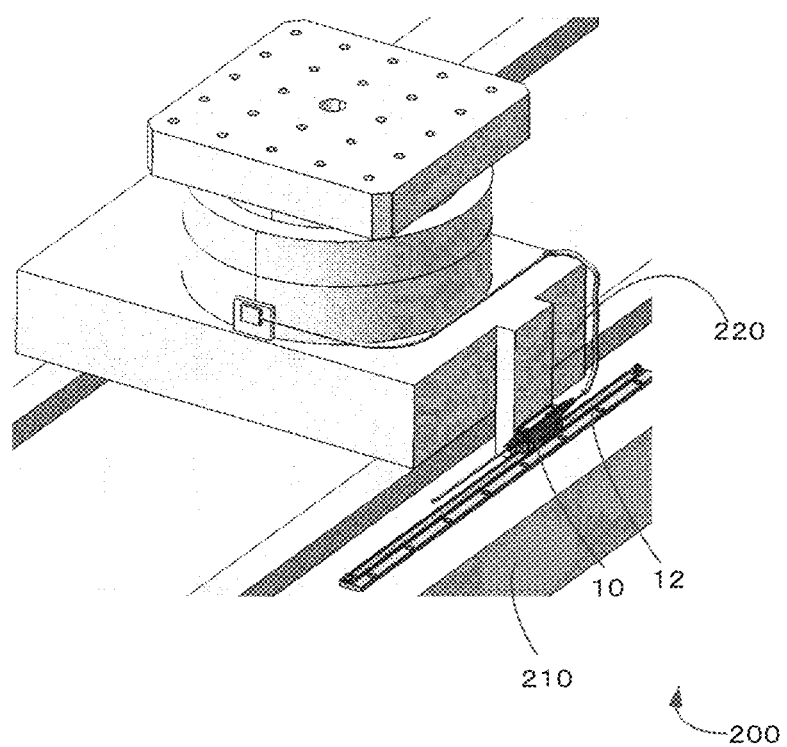
FIG. 5 is a perspective view schematically showing an example of a machine tool including a measurement apparatus including an abnormal state determination system.

Next, a machine tool including the measurement apparatus 2 including the abnormal state determination system 100 described in the above embodiments and the above examples of the circuit will be described with reference to FIG. 5. FIG. 5 is a perspective view schematically showing an example of a machine tool including the measurement apparatus including the abnormal state determination system.

In a machine tool 200 shown in FIG. 5, the scale 12 is attached to a frame 210, and the sensor 10 is attached to a processing table 220. Further, the machine tool 200 is connected via a cable to a control apparatus including a measurement unit, a correction amount calculation unit, an abnormality determination unit, a specific processing unit, and the like. With this, it is possible to accurately measure a position of the processing table 220 relative to the position of the frame 210.

The machine tool 200 largely vibrates at the time of, for example, rough processing. Therefore, the space between the sensor 10 and the scale 12 is changed, and thus, even in a case where the sensor 10 and the scale 12 do not relatively move, a strong detection signal (or a weak detection signal whose strength is cancelled depending on a direction of the vibration) may be input or a strong (or weak) detection signal may be input at an extremely short timing before a signal that periodically changes reaches a peak value. Even in such a case, the above abnormal state determination system 100 can quickly decrease (or increase) the strength of the detection signal and can therefore accurately perform the erroneous determination preventing control.

It is noted that, because of control processing performed by the abnormal state determination system 100, measurement by the measurement apparatus 2 can be continued even at the time of rough processing that causes large vibration. However, a measurement result may be influenced by a change in the space between the sensor 10 and the scale 12. However, when considering measurement accuracy that is necessary at the time of rough processing, this influence causes practically no problem.

The embodiments and aspects of the present invention have been described, but details of the configurations in the disclosure may be changed, and combinations of elements and orders thereof in the embodiments and aspects can be changed without departing from the scope of the claims and ideas of the present invention.

The invention claimed is:

1. An abnormal state determination system, comprising:
an abnormal state determination unit configured to determine an abnormal state by using a detection signal based on a signal output from a sensor; and
a specific processing unit configured to, when a predetermined condition is satisfied, perform control processing for adjusting strength of the detection signal before the detection signal is input to the abnormal state determination unit, wherein
a signal that periodically changes is output from the sensor, and
when a value of the detection signal based on the signal that periodically changes exceeds a predetermined range, the specific processing unit performs the control processing for adjusting the strength of the detection signal, and
wherein
the sensor is placed to have a predetermined space from a scale having a pattern, and the sensor outputs signals of a sine wave and a cosine wave due to relative movement between the sensor and the scale, and
the specific processing unit calculates a radius of a Lissajous circle formed by the sine wave and the cosine wave in the detection signal and, upon determining that the predetermined condition is satisfied when the radius exceeds the predetermined range, performs the control processing for adjusting the strength of the detection signal.

2. The abnormal state determination system according to claim 1, wherein
the specific processing unit determines whether the radius exceeds the predetermined range at each update timing of the detection signal.

3. The abnormal state determination system according to claim 2, wherein
when the value of the detection signal exceeds a threshold at a plurality of the update timings, the abnormal state determination unit determines that an abnormal state has occurred.

4. The abnormal state determination system according to claim 3, wherein
the threshold is defined by an input tolerance value of an AD converter placed on an upstream side of the abnormal state determination unit and the specific processing unit in a flow of the signal.

5. A measurement apparatus, comprising:
the abnormal state determination system and the sensor according to claim 4;
a measurement unit configured to define a measurement value by using the detection signal; and a correction amount calculation unit configured to correct the strength of the detection signal.

6. A machine tool, comprising the measurement apparatus according to claim 5.

7. A measurement apparatus, comprising:
the abnormal state determination system and the sensor according to claim 2;
a measurement unit configured to define a measurement value by using the detection signal; and
a correction amount calculation unit configured to correct the strength of the detection signal.

8. A machine tool, comprising the measurement apparatus according to claim 7.

9. A measurement apparatus, comprising:
the abnormal state determination system and the sensor according to claim 3;
a measurement unit configured to define a measurement value by using the detection signal; and
a correction amount calculation unit configured to correct the strength of the detection signal.

10. A machine tool, comprising the measurement apparatus according to claim 9.

11. A measurement apparatus, comprising:
the abnormal state determination system and the sensor according to claim 1;
a measurement unit configured to define a measurement value by using the detection signal; and
a correction amount calculation unit configured to correct the strength of the detection signal.

12. A machine tool, comprising the measurement apparatus according to claim 11.

13. The abnormal state determination system according to claim 1, wherein the sensor is a magnetic sensor placed to have the predetermined space from the scale having a magnetic pattern, and the sensor outputs signals of the sine wave and the cosine wave due to relative movement between the sensor and the scale.

* * * * *